United States Patent
Taguchi

(10) Patent No.: US 7,310,044 B2
(45) Date of Patent: Dec. 18, 2007

(54) TIRE CONDITION MONITORING SYSTEM AND METHOD

(75) Inventor: Akihiro Taguchi, Obu (JP)

(73) Assignee: Denso Corporation, Kariya (JP)

( * ) Notice: Subject to any disclaimer, the term of this patent is extended or adjusted under 35 U.S.C. 154(b) by 238 days.

(21) Appl. No.: 11/130,112

(22) Filed: May 17, 2005

(65) Prior Publication Data

US 2005/0253697 A1    Nov. 17, 2005

(30) Foreign Application Priority Data

May 17, 2004    (JP)    ............... 2004-146094
May 17, 2004    (JP)    ............... 2004-146104

(51) Int. Cl.
*B60C 23/00*    (2006.01)
*B60C 23/02*    (2006.01)

(52) U.S. Cl. ............... 340/442; 340/445; 340/447

(58) Field of Classification Search ........ 340/442–447; 73/146, 146.5; 116/34 B, 34 A, 34 R; 152/152.1
See application file for complete search history.

(56) References Cited

U.S. PATENT DOCUMENTS

| 2004/0055370 A1 | 3/2004 | Normann et al. |
| 2004/0090322 A1 | 5/2004 | Tsujita |
| 2004/0206168 A1* | 10/2004 | Katou et al. ............ 73/146 |

* cited by examiner

*Primary Examiner*—Benjamin C. Lee
*Assistant Examiner*—Travis R. Hunnings
(74) *Attorney, Agent, or Firm*—Posz Law Group, PLC

(57) ABSTRACT

A tire condition monitoring system for a vehicle has a chassis-side transmitter/receiver and a tire-side transmitter/receiver. The tire-side transmitter/receiver measures an interval between two successive request signals of the chassis-side transmitter and controls a time point of transmission of a response signal of the tire-side transmitter/receiver based on the measured interval so that the response signal is transmitted when the tire-side transmitter/receiver is in the communication range of the chassis-side transmitter/receiver. A control unit determines a time interval of one rotation of a tire based on a vehicle speed, and drives the chassis-side transmitter/receiver to transmit the request signal at an interval set to be shorter than an interval in which the tire rotates the communication range of the chassis-side transmitter/receiver.

9 Claims, 6 Drawing Sheets

TIRE CONDITION MONITORING SYSTEM AND METHOD

CROSS REFERENCE TO RELATED APPLICATION

This application is based on and incorporates herein by reference Japanese Patent Applications No. 2004-146094 and No. 2004-146104, both being filed on May 17, 2004.

FIELD OF THE INVENTION

The present invention relates to a tire condition monitoring system and method, which monitor a tire condition such as a pneumatic pressure of a tire of a vehicle.

BACKGROUND OF THE INVENTION

Some tire condition monitoring systems for vehicles have pressure sensors and transmitters mounted on tire wheels, respectively, and receivers mounted on wheel houses, respectively. In this system, the pressure sensors periodically detect air pressures in the tires as tire information and the transmitters transmit the tire information to the receivers, respectively, when a predetermined condition defined by pressure changes, times or the like holds.

Other tire condition monitoring systems further have transmitters on the wheel houses to transmit trigger signals from the chassis side and receivers on the tire wheels, so that the transmitters on the tire side transmit the tire information in response to the trigger signals from the chassis side.

In the latter systems, in which bi-lateral communications are attained between the chassis side and the tire side, a communication range is limited to be less than an entire periphery (360°) due to communication regulations, power consumption or the like. The communication is enabled only when the tire-side transmitter/receiver enters the limited communication range of the chassis-side transmitter/receiver. This results in low rate of reception of the tire information. Since the communication period becomes shorter as the vehicle travels at higher speeds, the communication rate becomes further low. In the case in which the tire-side transmitter/receiver receives electric power from the chassis side, the period for receiving the electric power from the chassis side becomes shorter as the vehicle travels at higher speeds, thus resulting in insufficient power reception from the chassis side.

SUMMARY OF THE INVENTION

It is therefore an object of the present invention to provide a tire condition monitoring system and method, which enable a chassis-side transmitter/receiver to receive tire information from a tire-side transmitter/receiver with higher reception rate and enables the tire-side transmitter/receiver to receive more electric power from the chassis side.

A tire condition monitoring system for a vehicle has a chassis-side transmitter/receiver for transmitting a request signal and a tire-side transmitter/receiver for detecting a tire condition and transmitting a response signal including tire condition information in response to the request signal.

According to one aspect of the present invention, the tire-side transmitter/receiver measures a vehicle speed or a rotation speed of the tire, which may be represented with an interval between two successive receptions of a request signal, and controls a time point of transmission of the response signal based on the vehicle speed so that the response signal is transmitted when the tire-side transmitter/receiver is in the communication range of the chassis-side transmitter/receiver. The tire-side transmitter/receiver preferably converts electromagnetic energy of the request signal to electric energy, and transmits the response signal only when the electric energy reaches a predetermined threshold level.

According to another aspect of the present invention, a control unit determines a time interval of one rotation of a tire based on a vehicle speed, and drives the chassis-side transmitter/receiver to transmit the request signal at an interval set to be shorter than an interval in which the tire rotates the communication range of the chassis-side transmitter/receiver. The control unit determines that the tire-side transmitter/receiver is at a position in the communication range when the response signal is received by the chassis-side transmitter/receiver.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENT

First Embodiment

Figure 1:
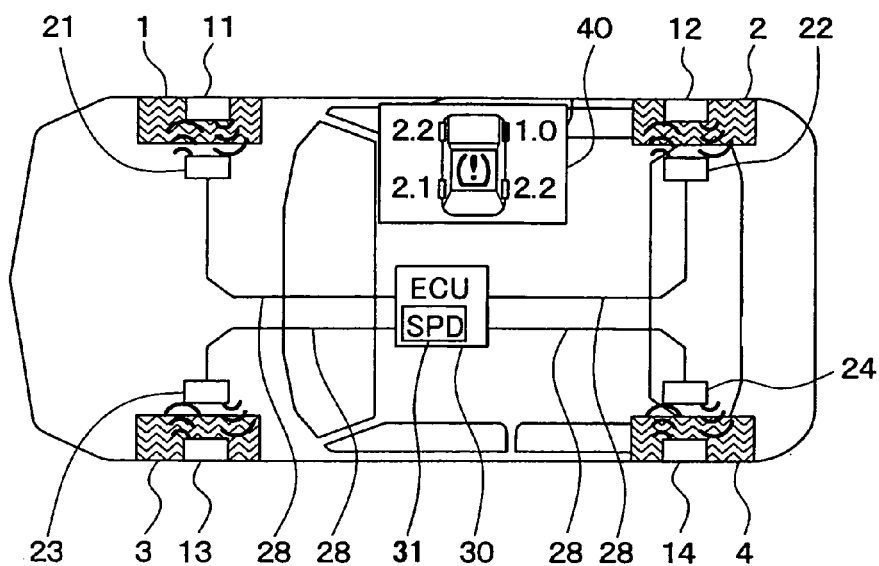
FIG. 1 is a schematic diagram showing a tire condition monitoring system according to a first embodiment of the present invention.

Referring to FIG. 1, a tire condition monitoring system has tire-side transmitter/receivers 11-14 mounted on tires 1-4, respectively, and chassis-side transmitter/receiver 21-24 mounted on a vehicle chassis to face the tires 1-4 in correspondence with the transmitter/receivers 11-14, respectively. The system further has an electronic control unit (ECU) 30 connected to the chassis-side transmitter/receivers 21-24, and a display 40 mounted in a passenger compartment for displaying the tire conditions. The display 40 may use a display of other electronic devices in a vehicle like a navigation device. The transmitter/receivers 11-14 and 21-24 perform bi-lateral (two-way) radio signal communications, respectively.

Figure 2:
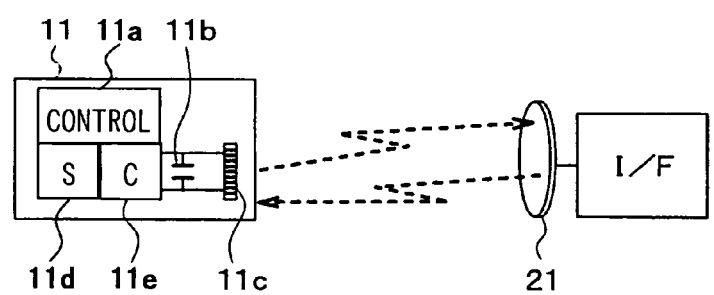
FIG. 2 is s schematic diagram showing a tire-side transmitter/receiver used in the first embodiment.

Each tire-side transmitter/receiver 11-14 may be constructed in the same way and may be a known-type integrated with an air valve of a disk wheel of a tire. As shown in FIG. 2, the tire-side transmitter/receiver 11 includes a communication control circuit 11$a$, an antenna capacitor 11$b$ and an antenna 11$c$. The control section 11$a$ includes a tire condition sensor 11$d$, which detects air pressure in the tire 1, and a capacitor 11$e$, which stores energy. The tire condition sensor 11$d$ may detect a temperature in the tire 1 as a tire condition in addition to or alternative to the air pressure.

The control circuit 11$a$ generates a response signal including the detected tire condition detected by the sensor 11$d$ and transmits it from the antenna 11$c$ in response to a request signal from the transmitter/receiver 21 on the chassis side. This response signal also includes an identification code of the transmitter/receiver 11 as a part of tire condition information. The radio frequency used for transmitting the request signal from the transmitter/receiver 21 and the radio frequency used for transmitting the detection signal from the transmitter/receiver 11 are different.

The transmitter/receiver 11 has no storage battery therein. It receives the request signal from the transmitter/receiver 21 as an electromagnetic energy wave, converts this signal to electric energy and stores it in the capacitor 11$e$, which is used as an electric power source.

The transmitter/receivers 21-24 on the chassis-side are connected to the ECU 30 through respective signal lines 28. The transmitter/receivers 21-24 may alternatively be wireless-connected without signal lines 28. Each transmitter/receiver 21-24 receives the response signal from the corresponding transmitter/receiver 11-14 and applies a voltage signal corresponding to the received response signal to the ECU 30.

The ECU 30 is constructed with a microcomputer, a ROM, a RAM and the like. The ECU 30 is supplied with electric power from a storage battery (not shown) mounted on the vehicle, and each transmitter/receiver 21-24 is supplied with electric power through the ECU 30.

Figure 3:
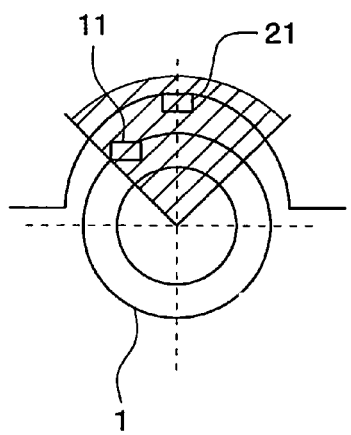
FIG. 3 is a schematic view showing a communication range of a chassis-side transmitter/receiver used in the first embodiment.

The range of communications between each transmitter/receiver 11-14 on the tire side and a corresponding transmitter/receiver 21-24 on the chassis side is limited to a certain angle (hatched) as shown in FIG. 3. That is, the communication range between the transmitter/receiver 11 and 21 are limited to an area in which the transmitter/receiver 11 is close to the transmitter/receiver 21. The transmitter/receiver 11 can receive the request signal as the power signal from the transmitter/receiver 21 only when its rotational position is within the limited area.

Figure 4:
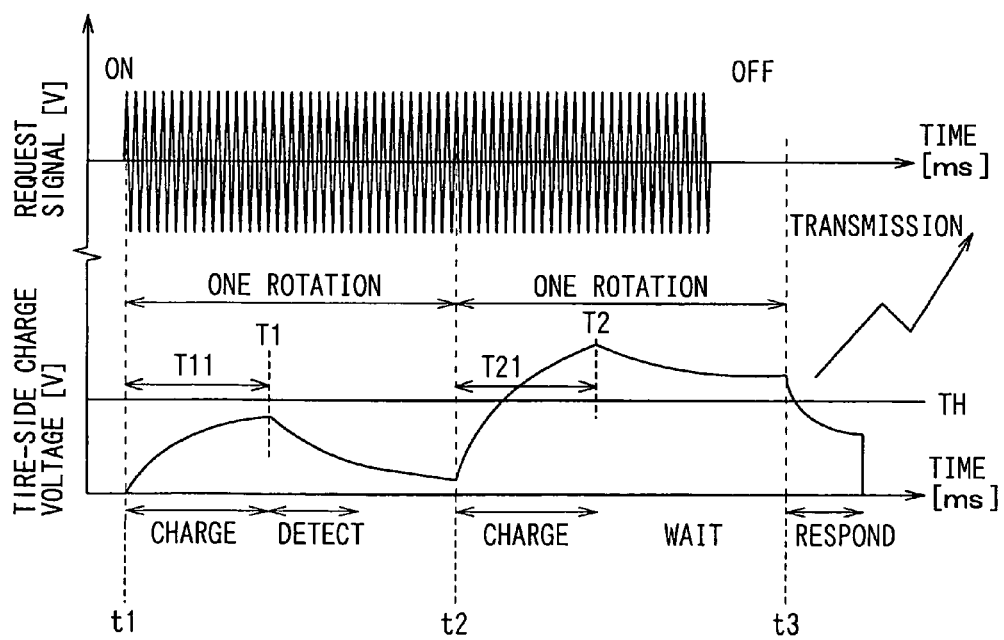
FIG. 4 is a timing diagram showing a terminal voltage and a charging voltage of the chassis-side transmitter and receiver in the first embodiment.

As shown in FIG. 4, the transmitter/receiver 21 continues to transmit the request signal during a predetermined time interval. During the first rotation (time interval T1 from time t1) of the tire 1, the transmitter/receiver 11 receives the request signal (ON) during a certain interval T11 corresponding to the communication range and converts its electromagnetic energy to the electric power to charge the capacitor 11$e$. If the electric power, that is, charged voltage, does not exceed a threshold level TH, which is required for the transmitter/receiver 11 to transmit the response signal to the transmitter/receiver 21. With this stored power, however, the transmitter/receiver 11 detects the air pressure in the tire 1.

During the subsequent rotation (time interval T2 from time t2) of the tire 1, the transmitter/receiver 11 repeats the conversion and charging operation for a time interval T21 corresponding to the communication range in the similar manner as in the first rotation. The charged voltage will exceed the threshold level TH. The transmitter/receiver 11 measures the time interval T1 (=t2–t1) between two receptions of the request signal from the transmitter/receiver 21. This measured time interval T1 corresponds to a rotational speed of the tire 1 and hence a vehicle travel speed. From this measured time interval T1, the transmitter/receiver 11 determines or estimates a time point t3 when it will enter the communication range next time. Thus, the transmitter/receiver 11 transmits tire condition information as the response signal to the transmitter/receiver 21 at the determined time point t3, that is, when the tire 1 rotates to the position at which communication with the transmitter/receiver 21 becomes possible, after waiting for a certain interval and on a condition that the request signal is not transmitted from the transmitter/receiver 21.

Figure 5:
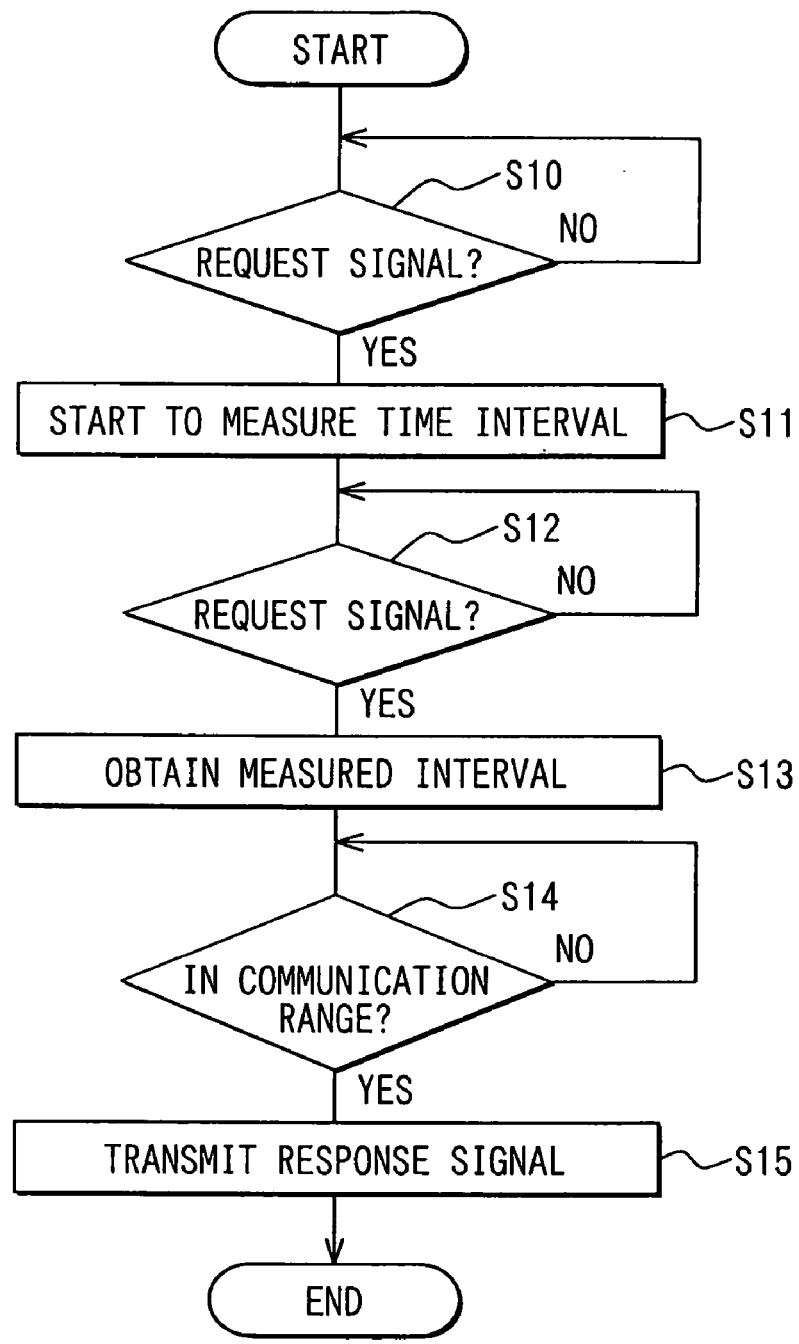
FIG. 5 is a flow diagram showing processing for specifying a tire-side transmitter/receiver executed by an electronic control unit in the first embodiment.

The transmitter/receiver 11, specifically the control circuit 11$a$, determines the rotational position of the tire 1 by executing the processing shown in FIG. 5. The control circuit 11$a$ checks at step S10 whether the request signal from the transmitter/receiver 21 is received. If not (NO), it continues step S10 until the request signal is received. If received (YES), the control circuit 11$a$ starts to measure a time interval (e.g., T1) at step S11. At this time, the tire condition such as tire air pressure is detected.

The control circuit 11$a$ checks at step S12 a next reception of the request signal in the similar manner as at step S10. When the next reception is made (YES), the control circuit 11$a$ obtains the measured time interval (e.g., T1) between the successive receptions of the request signal at step S13.

The control circuit 11$a$ then checks at step S14 whether the transmitter/receiver 11 is within the specified range of communication with the transmitter/receiver 21 and whether the tire condition has been detected. This checking of the position of the transmitter/receiver 11 may be attained by checking whether the measured time interval (e.g., T1) has passed after the reception of the request signal (S12: YES). When the tire 1 is within the specified range (YES), that is, the measured time interval (e.g., T1) has passed, the transmitter/receiver 11 transmits the response signal to the transmitter/receiver 21 at step S15. For completing the transmission within the communication range, it is preferred to measure also the time interval of the communication range (e.g., T11) and use this measured time interval to limit the transmission interval of S15.

According to the first embodiment, each transmitter/receiver 11-14 determines a communication range based on the time interval of successive request signals and transmits the tire condition information only when the transmitter/receiver 11-14 rotates to a position at which the communication with the transmitter/receiver 24 becomes possible. Therefore, the rate of reception of the tire condition information at the chassis side is increased.

The transmitter/receiver 11-14 transmits the response signal to the transmitter/receiver 21-24 only when the converted and stored electric power rises to the threshold level. Therefore, even in the case that the vehicle travels at high speeds and the electric power increase per tire rotation is small, the response signal transmission from the transmitter/receiver 11-14 can be attained without fail by continuing the conversion and storage for a plurality of request signals and transmitting it only after the stored power rises to the threshold level.

Second Embodiment

Figure 6:
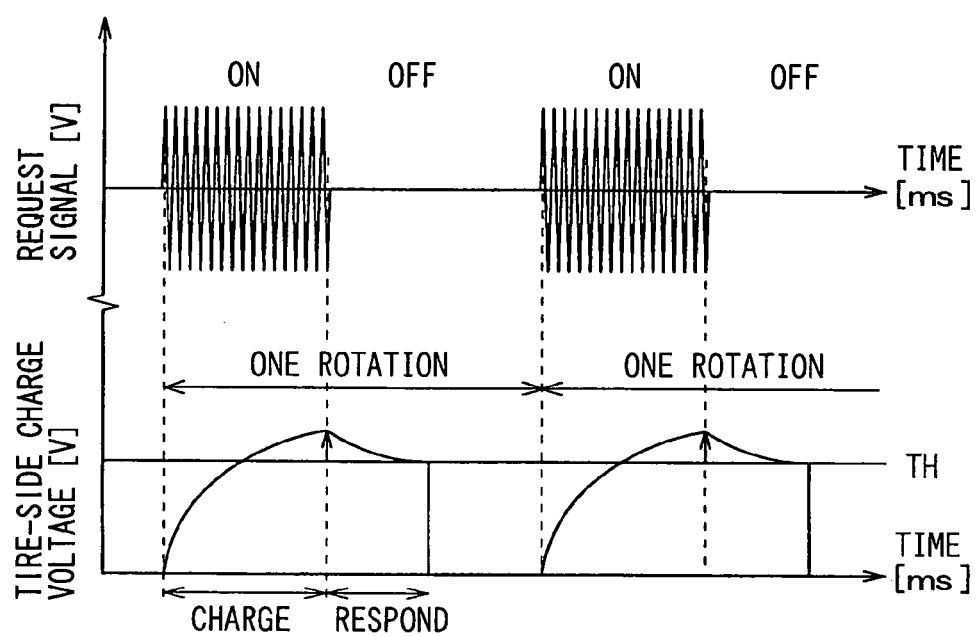
FIG. 6 is a timing diagram showing a terminal voltage and a charging voltage of a chassis-side transmitter/receiver position in a second embodiment of the present invention.

The second embodiment is similar to the first embodiment. In the second embodiment, however, a speed sensor 31 for detecting a vehicle travel speed is provided as a part of the ECU 30 as shown in FIG. 1. Further, as shown in FIG. 6, the transmitter/receiver 21 transmits the response signal intermittently and the transmitter/receiver 11 on the tire 1 transmits the response signal at a time point of termination of the request signal from the transmitter/receiver 21 when the stored electric power in the transmitter/receiver 11 exceeds the threshold level TH.

When the transmitter/receiver 11 is in the communication range of the transmitter/receiver 21, the transmitter/receiver 21 receives the response signal from the transmitter/receiver 11 in response to the request signal from the transmitter/receiver 21. Therefore, the transmitter/receiver 21 can determine the position of the transmitter/receiver 11 by transmitting the request signal from the transmitter/receiver 21 at a predetermined interval and receiving the response signal from the transmitter/receiver 11.

Figure 7:
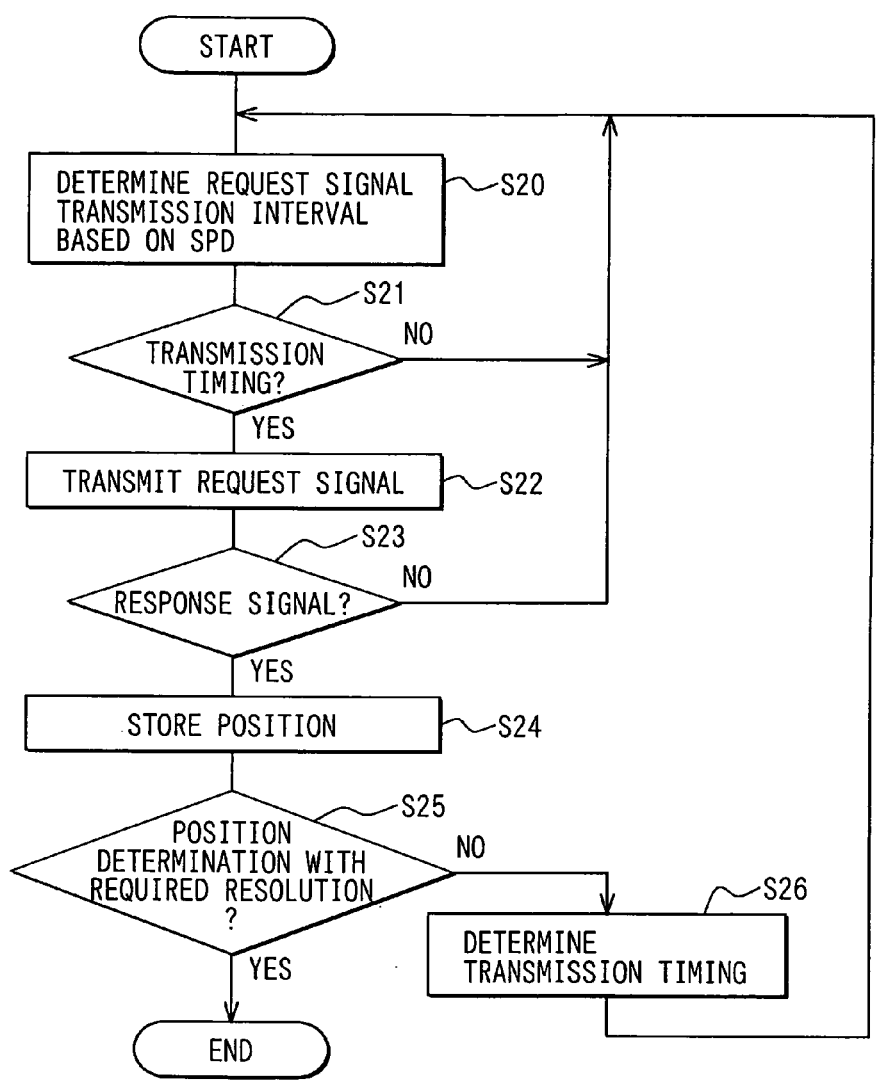
FIG. 7 is a flow diagram showing processing for specifying a tire-side transmitter/receiver position executed by an electronic control unit in the second embodiment.

Specifically, the ECU 30 executes the processing shown in FIG. 7 to determine the position of the transmitter/receiver 11. The ECU 30 determines at step S20 a sampling period, that is, a time interval of transmitting the request signal from the transmitter/receiver 21 based on the vehicle speed SPD detected by the speed detector 31. If the communication range (hatched in FIG. 8) is 100° relative to one rotation angle 360° of the tire 1, the position of the transmitter/receiver 11, that is, whether the transmitter/receiver 11 is in the communication range, can be detected at least once as long as transmitting the request signal, that is, sampling, is made more than 3.6 (360°/100°) times per rotation of the tire 1.

The ECU 30 then checks at step S21 whether it is a sampling timing to transmit the request signal. If so (YES), the ECU 30 drives the transmitter/receiver 21 to transmit the request signal at step S22. The ECU 30 checks at step S23 whether the transmitter/receiver 21 received the response signal. If no response signal was received (NO), the processing returns to step S20. If the response signal was received (YES), the ECU 30 stores at step S24 the position of the transmitter/receiver 11 in its memory. This position is represented with one of the samplings in which the response signal was received.

The ECU 30 checks at step S25 whether the position of the transmitter/receiver 11 was determined with required resolution. Here, the required resolution is determined based on the vehicle speed. The allowable communication period becomes shorter as the vehicle speed increases. Therefore, the position of the transmitter/receiver 11 is required to be determined with higher resolution, that is, in unit of a smaller rotation angular interval. Therefore, this unit of rotation angular interval must be determined in consideration of a highest possible vehicle speed or rotation speed of the tire 1.

If the position is not determined with the required resolution (NO), the ECU 30 newly determines the transmission timing at step S26. In this step S26, for instance, the ECU 30 changes of shifts the sampling interval and checks whether the response signal is received near (preceding to or following from) the position stored at step S24. The ECU 30 repeats steps S20 to S26 until the position of the transmitter/receiver 11 is successfully specified with the required resolution.

Figure 8:
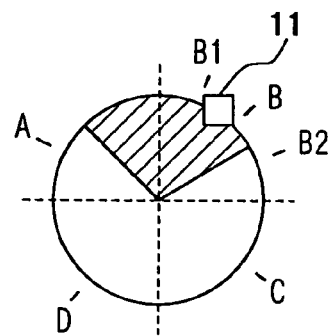
FIG. 8 is a schematic diagram showing sampling operation in the second embodiment.

The above operation is exemplified in FIG. 8. In this example, it is assumed that the sampling is made four times in each rotation and the response signal from the transmitter/receiver 11 is received when sampling is made at a position (sampling time) B among four positions (sampling times) A to D. This sampling time B is stored in the memory (step S24).

If the transmitter/receiver 11 is near the position B, which is close to the limit of the communication range, the communication between the transmitter/receivers 11 and 21 may become impossible when the vehicle travel speed increases. This is because the time interval corresponding to the communication range is narrowed when the vehicle travel speed increases. Therefore, after the position of the transmitter/receiver 11 is stored, similar samplings are made at two different sampling times B1 and B2 before and after the sampling time B by changing the sampling interval (step S26). One of the two sampling times (position B1) is stored in the memory in place of the previous position B. By repeating this operation until the position of the transmitter/receiver 11 changes less than a predetermined angular interval (required resolution), the position of the transmitter/receiver 11 is finally defined.

According to the second embodiment, the ECU 30 determines the position of each transmitter/receiver 11-14 on the tire 1-4 by execution of the above processing for other transmitter/receivers. After the position determination, the ECU 30 calculates the position of the transmitter/receiver 11-14 in accordance with the vehicle speed and drives the transmitter/receiver 21-24 to transmit the request signal only when the transmitter/receiver 11-14 is within the communication range. As a result, the rate of reception of the response signal from the tire side can be increased. The ECU 30 preferably stops transmission of the request signal when the transmitter/receiver 11-14 is not in the communication range, that is, not close to the transmitter/receiver 21-24, thereby reducing power consumption.

In the second embodiment, the processing of determination of the transmitter/receiver 11-14 may be executed at the time of installing the system on the vehicle for the first time. Alternatively, it may be executed when the transmitter/receiver 11-14 and the transmitter/receiver 21-24 cannot communicate each other, respectively, for more than a predetermined number of times. The position data about the transmitter/receiver 11-14 which the transmitter/receiver 21-24 holds is considered to include an error. Therefore, the position determination processing may be executed after a certain time elapse in which the error will increase.

The sampling interval need not be set shorter than a time interval of one rotation of the tire when the tire rotates at high speeds, but may be set longer than the one rotation time interval. That is, assuming that the tire rotation time interval is Tr and the sampling interval is Ts, the request signal may be transmitted from the transmitter/receiver 21-24 at an interval of Tr+Ts.

The position determination may be attained based on the signal level of the response signal received by the transmitter/receiver 21-24.

In the case of communication in the LF band, for instance, the level of reception of the response signal at the transmitter/receiver 21-24 is proportional to $1/D^3$ (an inverse of a distance D to the third power, the distance D being between the transmitter/receiver 11-14 and the corresponding transmitter/receivers 21-24). Therefore, the response signal reception level becomes higher as the transmitter/receiver 11-14 is closer to the transmitter/receiver 21-24. If a maximum value of the response signal reception level is known, the transmitter/receiver 11-14 can be determined to be at the position closest to the transmitter/receiver 21-24 when the response signal reception level reaches the maximum value by comparing the actual response signal level with the maximum value.

The position of the transmitter/receiver 11-14 may be determined based on changes of the response signal reception level without using the maximum value. Specifically, when the signal reception level increases, the transmitter/receiver 11-14 may be determined to be at a position which is rear side from the position of communication. On the other hand, when the signal reception level decreases, the transmitter/receiver 11-14 may be determined to be at a position which is front side from the position of communication.

Figure 9:
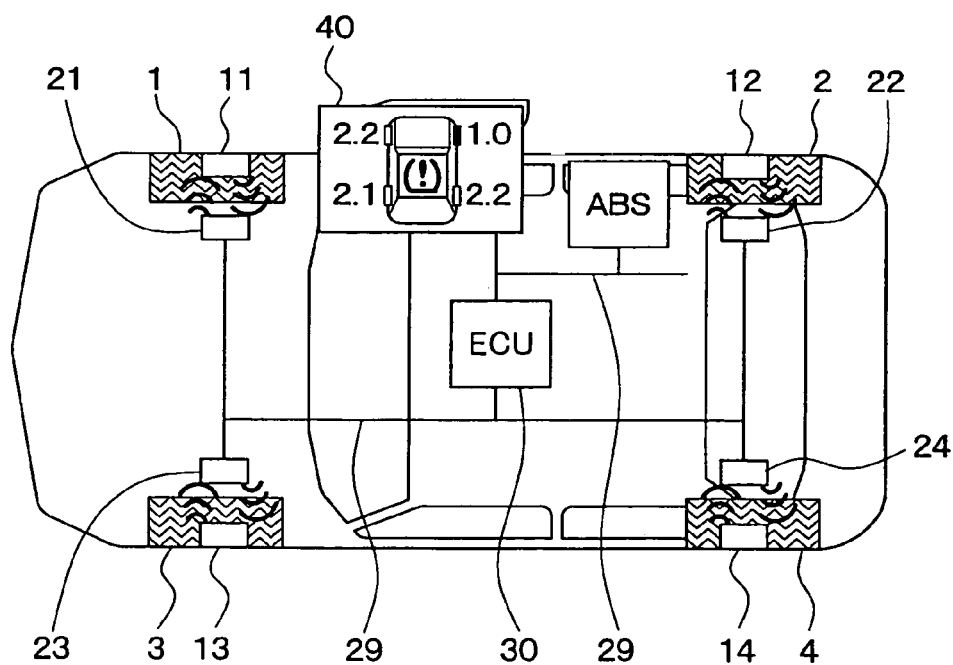
FIG. 9 is a schematic diagram showing a tire condition monitoring system according to a modification of the first and the second embodiments.

Both of the embodiments may be modified in other ways. For instance, as shown in FIG. 9, the transmitter/receivers 21-24, the ECU 30 and the display 40 may be connected with an in-vehicle LAN 29 in place of signal lines 28. The transmitter/receiver 11-14 may be operated with a built-in battery without getting electric energy from the request signal.

What is claimed is:

1. A tire condition monitoring system for a vehicle having a chassis and a tire, the system comprising:
    a tire-side transmitter/receiver, mounted on the tire, for detecting a tire condition and transmitting tire condition information as a response signal including the detected tire condition in response to a request signal; and
    a chassis-side transmitter/receiver, mounted on the chassis of the vehicle, for transmitting the request signal to the tire-side transmitter/receiver and receiving the tire condition information from the tire-side transmitter/receiver,
    wherein the tire-side transmitter/receiver includes control means for measuring an interval between two successive reception time points of the request signal transmitted from the chassis-side transmitter/receiver as a travel speed of the vehicle, the two successive reception time points each being defined as a point at which the tire-side transmitter/receiver rotates into a communication range of the chassis-side transmitter/receiver, and for controlling a time point of transmission of the response signal based on the travel speed of the vehicle so that the response signal is transmitted when the tire-side transmitter/receiver is in the communication range of the chassis-side transmitter/receiver.

2. The tire condition monitoring system as in claim 1, wherein the control means determines the time point of transmission of the response signal to be a time point which is later than a second reception time point of the two successive reception time points by the measured interval.

3. The tire condition monitoring system as in claim 2, wherein the tire-side transmitter/receiver transmits the response signal after a transmission of the request signal stops.

4. The tire condition monitoring system as in claim 1, wherein the tire-side transmitter/receiver includes conversion means for converting electromagnetic energy of the request signal to electric energy, and transmits the response signal only when the electric energy reaches a predetermined threshold level.

5. A tire condition monitoring method for a vehicle, the method comprising:
    transmitting a request signal continuously for a predetermined interval from a chassis-side transmitter/receiver mounted on a chassis of the vehicle to a tire-side transmitter/receiver mounted on a tire of the vehicle;
    detecting a time point of reception of the request signal by the tire-side transmitter/receiver;
    measuring a time interval from a detected time point of reception of the request signal; and
    transmitting tire condition information from the tire-side transmitter/receiver to the chassis-side transmitter/receiver as a response signal in response to the request signal, when a measured time interval from the detected time point reaches a time interval of one rotation of the tire.

6. The tire condition monitoring method as in claim 5, further comprising:
    measuring a time interval between two detected time points of reception of the request signal to determine the time interval of one rotation of the tire.

7. The tire condition monitoring method as in claim 5, wherein the step of transmitting the tire condition is effected only after the predetermined interval of transmission of the request signal.

8. The tire condition monitoring method as in claim 5, wherein the predetermined interval of transmission of the request signal is set longer than the time interval of one rotation of the tire.

9. The tire condition monitoring method as in claim 5, further comprising:
    converting the response signal received by the tire-side transmitter/receiver into electric power while the tire-side transmitter/receiver is in a communication range with the chassis-side transmitter/receiver;
    storing the electric power in the tire-side transmitter/receiver; and
    detecting a tire condition as the tire condition information by a sensor operated with the stored electric power.

* * * * *